US012600028B2

(12) United States Patent
Zimmer et al.

(10) Patent No.: US 12,600,028 B2
(45) Date of Patent: Apr. 14, 2026

(54) INDUSTRIAL ROBOT COMPRISING AN AXLE DRIVE WITH A COMPACT CONSTRUCTION

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 97 days.

(21) Appl. No.: 18/574,421

(22) PCT Filed: Jun. 25, 2022

(86) PCT No.: PCT/DE2022/000073
§ 371 (c)(1),
(2) Date: Dec. 27, 2023

(87) PCT Pub. No.: WO2023/274439
PCT Pub. Date: Jan. 5, 2023

(65) Prior Publication Data
US 2024/0316758 A1 Sep. 26, 2024

(30) Foreign Application Priority Data
Jun. 29, 2021 (DE) ..................... 10 2021 003 318.3

(51) Int. Cl.
| | |
|---|---|
| B25J 9/10 | (2006.01) |
| B25J 11/00 | (2006.01) |
| B25J 19/00 | (2006.01) |
| B25J 19/02 | (2006.01) |
| E02D 7/08 | (2006.01) |

(52) U.S. Cl.
CPC ............. B25J 9/103 (2013.01); B25J 11/005 (2013.01); B25J 19/0054 (2013.01); B25J 19/02 (2013.01)

(58) Field of Classification Search
CPC ...... B25J 9/103; B25J 11/005; B25J 19/0054; B25J 19/02; E02D 7/08
See application file for complete search history.

(56) References Cited

U.S. PATENT DOCUMENTS

| | | | |
|---|---|---|---|
| 4,399,718 A | 8/1983 | Zimmer |
| 4,548,097 A | 10/1985 | Zimmer |

(Continued)

FOREIGN PATENT DOCUMENTS

| | | |
|---|---|---|
| DE | 3308413 C1 | 10/1984 |
| DE | 3115061 C2 | 5/1985 |

(Continued)

*Primary Examiner* — Harry Y Oh
(74) *Attorney, Agent, or Firm* — Smartpat PLC

(57) ABSTRACT

An industrial robot has at least one translational or rotational axis, having an output element that has a toothing and at least one axis drive assembly that is associated with the translational or rotational axis and that meshes with the output element. The axis drive assembly has a drive motor and at least one transmission arranged downstream of the drive motor. In the case of a translational axis, the output element is a toothed rod. In the case of a rotational axis, the output element is a spur gear with an outer toothing. In addition, the transmission has at least one branching stage that distributes the rotational movement of the motor shaft of the drive motor to at least two gear trains, such that at least two pinions driven by means of the drive motor mesh with the output element.

9 Claims, 9 Drawing Sheets

(56)  References Cited

U.S. PATENT DOCUMENTS

| 4,741,218 | A | | 5/1988 | Zimmer | |
|---|---|---|---|---|---|
| 5,085,619 | A | * | 2/1992 | Torii | B25J 9/1045 |
| | | | | | 474/138 |
| 5,882,158 | A | * | 3/1999 | Lechleiter | B23Q 5/56 |
| | | | | | 409/168 |
| 11,724,390 | B2 | * | 8/2023 | Santos | B25J 9/1653 |
| | | | | | 700/254 |
| 2020/0290197 | A1 | | 9/2020 | Inoue et al. | |

FOREIGN PATENT DOCUMENTS

| DE | 102020105466 | A1 | | 9/2020 | |
|---|---|---|---|---|---|
| DE | 102021003318 | A1 | * | 12/2022 | E02D 7/08 |
| EP | 0054763 | B1 | | 9/1984 | |

* cited by examiner 125
124
121
161
164
111

123
122
134
135
138
110
163
132
137

162      131      136      133

121
110
111
113
165
166

236   232   237   238   233   234   251   252   271   274

261   264   210   211   266   215   231   262   263      291

451
422
410
434
431
438
436
454
432
433
437
462
424
478
461
464
495
493

426
421
425
423
471
477
411
491
494
414

INDUSTRIAL ROBOT COMPRISING AN AXLE DRIVE WITH A COMPACT CONSTRUCTION

CROSS-REFERENCE TO RELATED APPLICATION

This application is a national stage application, filed under 35 U.S.C. § 371, of International Patent Application PCT/DE2022/000073, filed on Jun. 25, 2022, which claims the benefit of German Patent Application DE 10 2021 003 318.3, filed on Jun. 29, 2021.

BACKGROUND

DE 10 2020 105 466 A1 describes an industrial robot whose drive unit has a bevel gear with intersecting axes.

SUMMARY

The present disclosure describes an industrial robot with at least one drive with high dynamics. The industrial robot has at least one translational or rotational axis, having an output element that has a toothing and at least one axis drive assembly that is associated with the translational or rotational axis and that meshes with the output element, wherein the axis drive assembly has a drive motor and at least one transmission arranged downstream of the drive motor.

In the case of a translational axis, the output element is a toothed rod. In the case of a rotational axis, the output element is a spur gear with an outer toothing. In addition, the transmission has at least one branching stage that distributes the rotational movement of the motor shaft of the drive motor to at least two gear trains, such that at least two pinions driven by means of the drive motor mesh with the output element.

A branching stage is driven by means of an individual drive motor of the axis drive assembly. The branching stage has two gear trains on the output side. Each gear train has a pinion that rolls off the output element when the axis drive assembly is in operation. Such design enables high positioning accuracy and low backlash of the respective axis. The structure of the axis drive unit also enables the installation space to be used efficiently such that media, data and power lines can be routed to the individual axes of the industrial robot without any problems.

The industrial robot can be used as a processing robot and/or as a handling robot. When designed as a processing robot, the industrial robot carries a processing unit that, for example, carries a plurality of driven tools. The industrial robot is then used, for example, to process workpieces made from a wood-based material, a wood composite material, etc.

If the industrial robot is designed as a handling robot, it carries at least one handling tool, for example a gripper. This can be a gripper with adjustable gripper jaws, for example a parallel gripper, a centric gripper, etc. It is also conceivable to use a vacuum gripper. Such an industrial robot can be used, for example, to feed a machine tool for processing workpieces from the workpieces specified in connection with the processing robot.

Further details of the invention are given in the following description of schematically illustrated embodiments.

DETAILED DESCRIPTION

Figure 1:
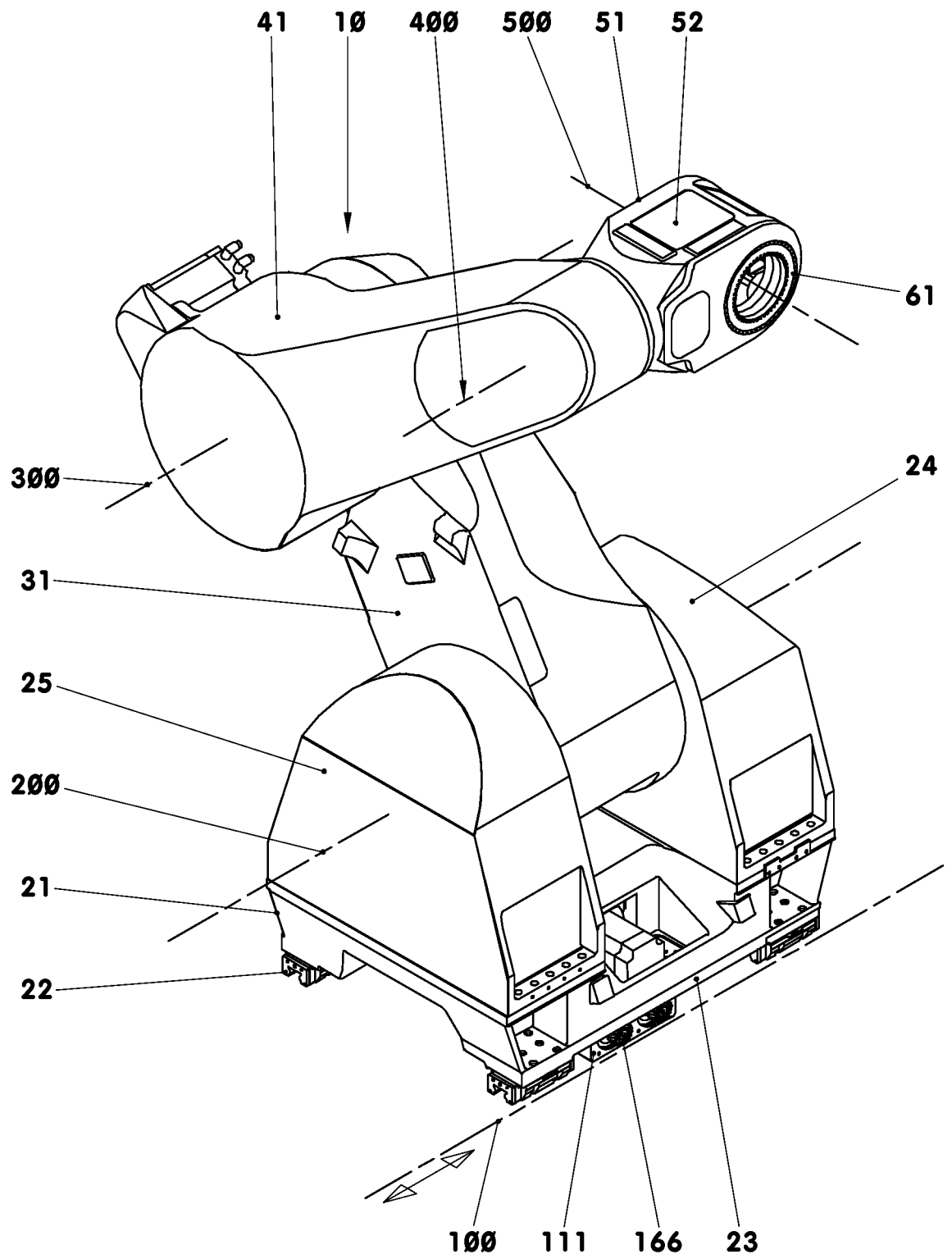
FIG. 1: Industrial robot
Figure 2:
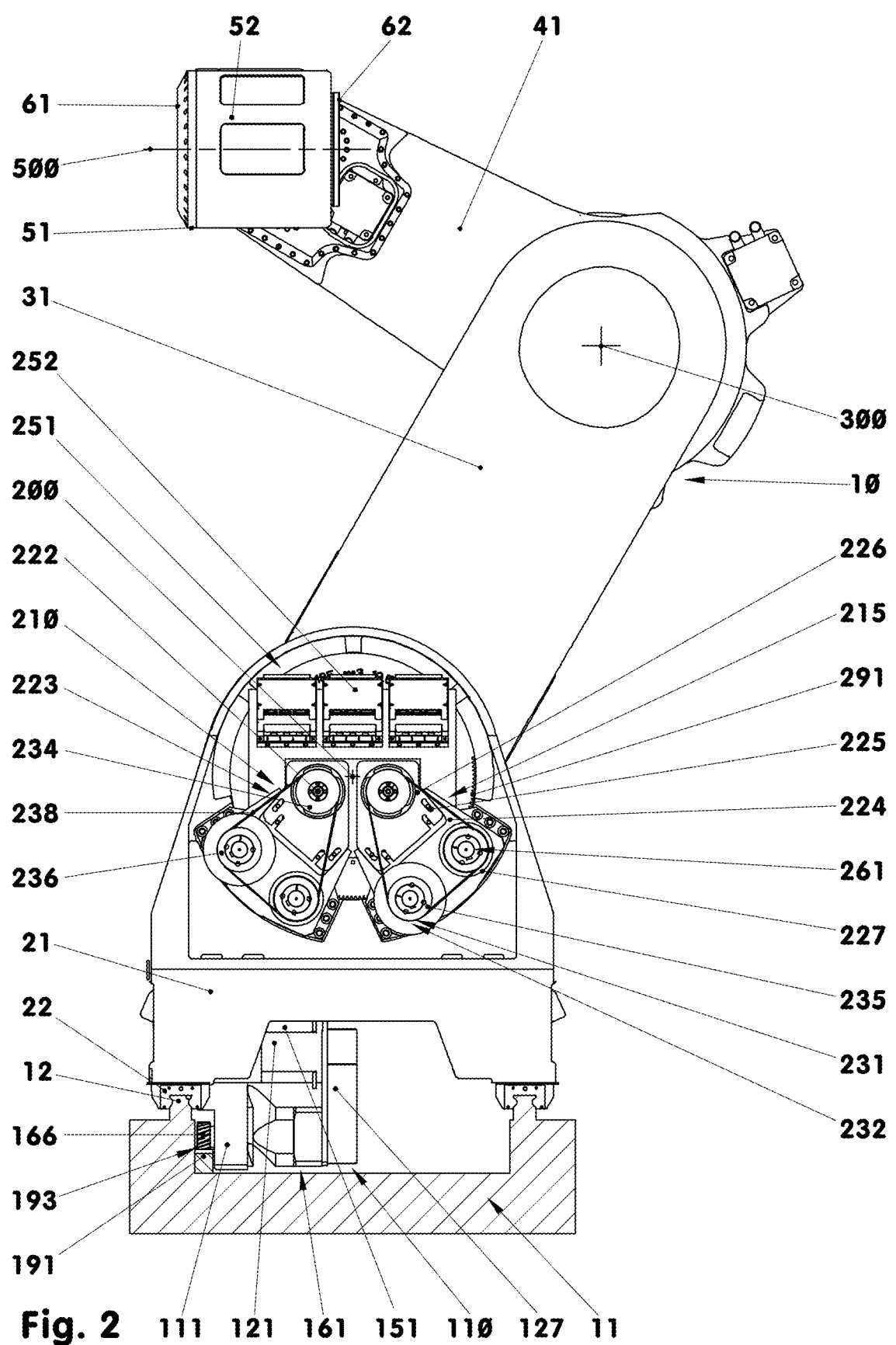
FIG. 2: Side view of the industrial robot.

FIGS. 1-13 show an industrial robot (10) in the structural form of a vertical articulated robot and individual component assemblies of such industrial robot (10). The industrial robot (10) is a five-axis robot, for example. It can be expanded to a six-axis robot by adding an additional handling axis, for example. Of the axes mentioned (100; 200; 300; 400; 500), three main axes (100, 200, 300) and two secondary axes (400, 500) are shown in the figures. The industrial robot (10) is designed as a kinematic chain.

The industrial robot (10) shown has TRR kinematics. It has a translational main axis (100) and two rotational main axis (200, 300). It is also conceivable to design the industrial robot (10) with three rotary main axes, i.e. with RRR kinematics. A different combination of the main axes (100, 200, 300) is also conceivable. For example, the industrial robot (10) can have two or three main translational axes.

The industrial robot (10) can also be designed as a parallel robot, a SCARA robot, a polar robot, a column-mounted robot, a surface gantry robot, etc. It has at least one driven main axis (100; 200; 300).

The first main axis (100), the A-axis (100), is the translational axis in the exemplary embodiment. It has an output element (191) arranged on a bed (11) of the industrial robot (10). In the exemplary embodiment, such output element (191) is a toothed rod (191). The toothed rod (191) is a gear wheel with an infinite diameter. The length of the toothed rod (191), for example, is slightly shorter than the length of the bed (11). An axis drive assembly (110) is arranged on a base frame (12) of the industrial robot (10) to drive the A-axis (100). It is also conceivable to arrange the axis drive assembly (110) on the bed (11) and the output element (191) on the base frame (12). The output element (191) can be a toothed rod or a spur gear with an outer toothing rotatably mounted in the base frame (12), for example. Four recirculating ball shoes (22) arranged on the lower side of the base frame (12) and guide rails (12) on the bed side are used to guide the base frame (12) on the bed (11), for example. For example, an absolute displacement measuring system (193) for the A-axis (100) can be arranged on the bed (11).

Figures 3, 4:
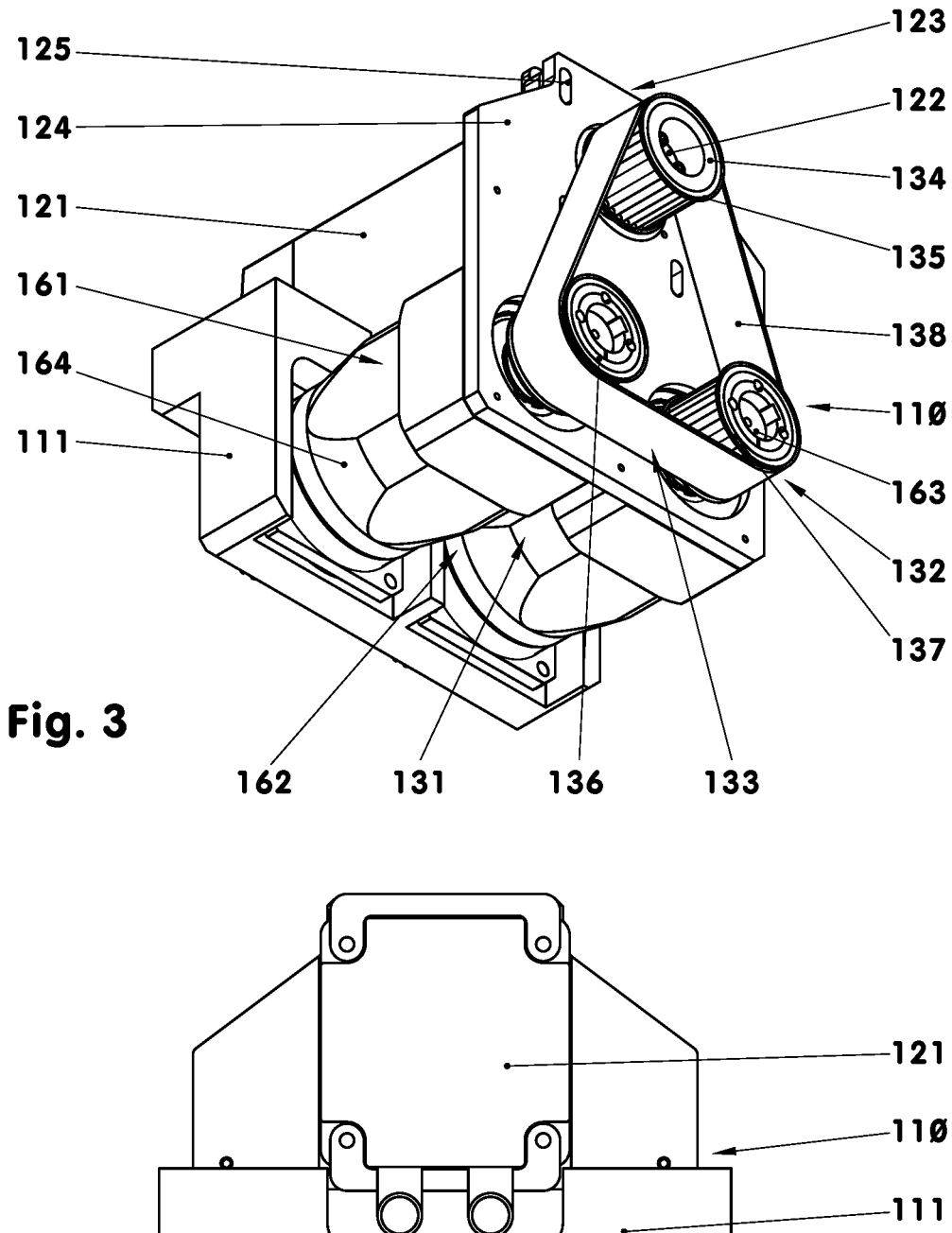
FIG. 3: Axis drive assembly of the A-axis.
FIG. 4: Front view of FIG. 3.
Figure 5:
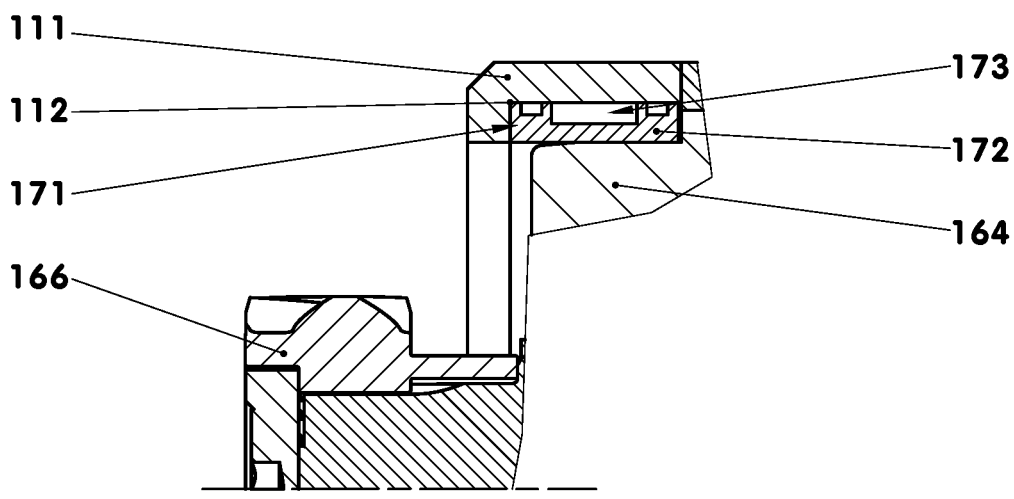
FIG. 5: Detail of the cooling assembly.

The axis drive assembly (110) of the A-axis (100), see FIGS. 3-5, comprises in the exemplary embodiment a fastening flange (111), a drive motor (121), a support plate assembly (123), a transmission (131), a covering hood (127) and a cooling assembly (171). The entire axis drive assembly (110) is joined to the base frame (21) by means of the fastening flange (111). For example, the fastening flange (111) is welded, screwed, etc. to the base frame (21).

The fastening flange (111) has two transmission mounts (112), see FIG. 5. These are designed as stepped bores. The two transmission mounts (112) have the same dimensions and are parallel to one another. In this exemplary embodiment, the fastening flange (111) carries a cooling assembly (171). The cooling assembly (171) has two cooling rings (172). In each case, one of such cooling rings (172) is seated in a manner pressed into one of the transmission mounts (112), for example. The individual cooling ring (172) has a cooling channel (173) on its circumferential surface. Such cooling channel (173) can be used, for example, for water cooling or oil cooling of the bearing of the transmission parts mounted in the transmission mounts (112). In the exemplary embodiment, the bearing of the pinion (166) is cooled by means of the cooling assembly (171). For example, the two cooling rings (172) are hydraulically connected in series.

The drive motor (121) is located in a recess (113) of the fastening flange (111). The drive motor (121) is a servomotor. It has, for example, a power of 6 kilowatts and a maximum torque of 100 Newton meters. In the exemplary embodiment, it has an absolute angle measuring system. This is an optical or capacitive encoder, for example. The motor control system (151) is arranged directly on the drive motor (121), for example. For example, an electronics component assembly with at least the motor control system is used for this purpose. The electronics component assembly can be arranged on a cooling plate, for example. For example, the cooling plate is connected in series with the other components of the cooling assembly (171) of the A-axis (100).

The power supply for the drive motor (121) and the control system is provided by a 600 volt cable, for example. There is also a bus system for data transmission to the drive control system. The drive motor (121) can have an emergency stop.

The motor shaft (122) of the drive motor (121) carries a toothed belt pulley (134). In the exemplary embodiment, such toothed belt pulley (134) has 32 teeth and lateral skirts (135). Its width is, for example, 50 millimeters.

The toothed belt pulley (134) is part of a serpentine drive (133). In the exemplary embodiment, this has two further toothed belt pulleys (136, 137). The first-mentioned, driving toothed belt pulley (134) and the two driven toothed belt pulleys (136, 137) are arranged in the form of an isosceles triangle in a top view of the serpentine drive (133). For example, all toothed belt pulleys (134, 136, 137) are designed identically. A circumferential toothed belt (138) connects the toothed belt pulleys (134, 136, 137). Such triangle drive (133) has no tensioning roller.

In the exemplary embodiment, the toothed belt (138) is a closed belt. For example, it is produced as an endless belt using a casting process. The toothed belt (138) is made of a thermoplastic material, for example, and has an inserted tension cord. The plastic mentioned can be, for example, polyoxymethylene (POM), polyurethane (PU), neoprene, chloroprene, etc. It can have a single or multi-layer structure. The tension cord can be made of steel, carbon fiber, polyamide fiber, glass fiber, etc. When a polyamide fiber is used, it can be produced from aramid, for example.

The individual teeth of the toothed belt (138) are designed to be identical to one another. They can be trapezoidal, semi-circular, curved, etc. A coating of the teeth, for example with polyamide, is also conceivable. In the exemplary embodiment, the toothed belt (138) has semicircular teeth and a pitch of 8 millimeters. The toothed belt pulleys (134, 136, 137) have a correspondingly adapted profile.

The driven toothed belt pulleys (136, 137) are rotatably mounted relative to the support plate assembly (123). The support plate assembly (123) has a support plate (124), which is arranged in a fixed position relative to the fastening flange (111). For example, the support plate (124) has four slotted holes (125). These are oriented normal to the straight line connecting the bearings of the two driven toothed belt pulleys (136, 137). The drive motor (121) is fastened in the slotted holes (125). Thereby, the drive motor (121) is arranged during operation such that the toothed belt (138) is tensioned. In the exemplary embodiment, the serpentine drive (133) is covered by the covering hood (127).

The driven toothed belt pulleys (136, 137) in each case are seated on a transmission shaft (163) of a gear transmission stage (162). The housings (164) of this gear transmission stage (162) are fixed in the support plate (124) and in the fastening flange (111). On the side of the fastening flange (111), the respective housing (164) is held in the cooling ring (172).

In the exemplary embodiment, the individual gear transmission stage (162) has a planetary gear. This, for example, has a reduction ratio of 1:12 to slow speed. A pinion (166) is seated on the output shaft (165) of the respective gear transmission stage (162). The individual pinion (166) is, for example, a helical-toothed spur gear (166). In the exemplary embodiment, it has 20 teeth and a module of 3 millimeters. The toothing of the pinion (166) and the output element (191) is, for example, an involute toothing. The individual pinion (166) can have a positive profile shift. A crowned design of the tooth flanks of the individual pinion (166) is also conceivable. Both pinions (166) mesh with the output element (191). This has the same module as the pinion (166) and is also helical-toothed. This means that the output has a high degree of overlap. The pinions (166) can be mutually braced in relation to the output element (191). Such transmission ratio is designed to be backlash-free, for example. Both the low moment of inertia of the drive, which is reduced to the motor shaft (122), and the high positioning accuracy of the axis drive assembly (110) and the output element (191) enable highly dynamic operation of the industrial robot (10).

An absolute measuring system (193) can be arranged on the axis drive assembly (110) and on the output element (191). This is, for example, a displacement measuring system that ascertains the position of the output element (191) relative to the axis drive assembly (110). The value ascertained in this manner is fed, for example, as an analog signal to the motor regulation system of the drive motor (121) of the axis drive assembly (110).

In the axis drive assembly (110), the transmission (131) is designed with two stages, for example. The first stage is a branching stage (132). The second transmission stage is the specified gear transmission stage (162). The transmission (131) can also be designed without a gear transmission stage (162). The branching stage (132) has the serpentine drive (133). It has an input, for example the motor shaft (122) of the drive motor (121). The outputs of the branching stage (132) are, for example, the transmission shafts (163) of the driven toothed belt pulleys (136, 137). Each of such outputs is part of a gear train (161) of the transmission (131). The two gear trains (161) of the transmission (131), for example, in each case have a gear transmission stage (162).

The axis drive assembly (110) requires only a small installation space. The individual gear transmission stage (162) and the individual pinion (166), for example, are designed to transmit the total power of the drive motor (121). This means that there is no risk of damage to the drive train even during highly dynamic operation. This is supported by water or oil cooling.

The arrangement of the axis drive assembly (110) also enables a decentralized arrangement of the drive motor (121) and its control system. The drive motor (121) can thus be arranged in such a manner that hydraulic, pneumatic, electrical, data-carrying or signal-carrying lines are not obstructed. When replacing the axis drive assembly (110), for example during maintenance, it can be removed together with the motor control system. For example, no adaptation is required in the higher-level control system of the industrial robot (10).

In the exemplary embodiment shown, the base frame (21) is formed with a U-shape. For example, it has a base plate (23) on which a mounting flange (24) and a support flange (25) are arranged. A foot lever (31) is pivotably mounted in the mounting flange (24) and in the support flange (25). The pivot axis (200) of the foot lever (31) in the base frame (21) is referred to below as the B-axis (200).

In the exemplary embodiment, two axis drive assemblies (210, 215) and an output element (291) interacting with these are used to drive the B-axis (200). In the representation in FIG. 2, the axis drive assemblies (210, 215) are arranged in the mounting flange (24) of the base frame (21). The output element (291) is fastened to the foot lever (31). In this exemplary embodiment, the output element (291) of the B-axis (200) is a spur gear with an outer toothing. For example, it carries a circumferential helical toothing. This toothing, for example, has 185 teeth with a module of 3 millimeters. The output element (291) is formed in a ring shape. For example, its inside diameter is 78% of the outside diameter of the output element (291). It is also conceivable to arrange the output element (291) in the base frame (21) and one or more axis drive assemblies (210, 215) in the foot lever (31). An electronics component assembly (251) is assigned to the drive of the B-axis (200). In the exemplary embodiment, this comprises three electronics modules (252), each of which is seated on a cooling plate (274). The cooling plate (274) through which water flows, for example, is part of the cooling assembly (271) of the B-axis (200).

The electronics modules (252) contain, for example, the entire motor regulation system of the B-axis (200) including the power electronics. Such decentralized arrangement requires only one data line and one power line from the higher-level control system of the industrial robot (10), which is arranged in an external control cabinet. For example, such lines are further routed from the A-axis (100). In the exemplary embodiment, the outputs of all sensors of the B-axis (200) are processed in the electronics component assembly (251) and modified values for the motor control system are ascertained from this.

In the exemplary embodiment, the two axis drive assemblies (210, 215) are designed as mirror images of one another in relation to a vertical central longitudinal plane of the base frame (21). The planes of the axis drive assemblies (210, 215), which contain the respective motor shaft (222) and lie normal to the connecting line of the associated transmission shafts (263), form an angle of, for example, 130 degrees with one another. Therefore, only one of the axis drive assemblies (210; 215) is described below.

The individual axis drive assembly (210; 215) of the B-axis (200) has a drive motor (221) and a two-stage transmission (231), for example. The transmission (231) can also be designed as single-stage or more than two-stage. The individual drive motor (221) of the B-axis (200) is designed, for example, in the same manner as the drive motor (121) of the A-axis (100). The transmission (231) has a branching stage (232) downstream of the drive motor (221). This drives two gear trains (261) parallel to one another. Each of the gear trains (261) has a gear transmission stage (262). In each case, the individual gear transmission stage (262) has a pinion (266) on the output side. All pinions (266) of the two axis drive assemblies (210, 215) mesh with the output element (291).

The branching stage (232) of both axis drive assemblies (210; 215) of the B-axis (200) in each case comprises a serpentine drive (233). This is designed in each case as a toothed belt drive in the structural form of a triangle drive (233). The individual toothed belt pulleys (234, 236, 237) in each case have 40 teeth and a width of 50 millimeters, for example. They are bordered on both sides by skirts (235). The toothed belt (238) is designed, for example, as described in connection with the A-axis (100). The geometric shape of the teeth of the toothed belt pulleys (234, 236, 237) is adapted to the shape of the teeth of the toothed belt (238).

In each of the gear trains (261), the fed torque is transmitted to the respective pinion (266) in each case by means of the gear transmission stage (262). In this exemplary embodiment, the individual gear transmission stage (262) also has a planetary gear. The planetary gear, for example, has a transmission ratio of 1:32. The respective pinion (266) is designed to be helical-toothed with involute toothing and has 20 teeth. The toothing of the pinions (266) with the output element (291) can be designed as zero toothing without a profile shift, as V-zero toothing with a profile shift adding up to zero or as V-toothing with a positive profile shift of the respective pinion (266). A crowned design of the tooth flanks of the pinion (266) and/or the output element (291) is also conceivable. All pinions (266) and the output element (291) of the B-axis (200) have axes parallel to one another. For example, in each case two pinions (266) can be braced against one another. The total drive power of the drive motors (221) is distributed to two or more pinions (266), for example.

The fastening flange (211) carries cooling rings of the cooling assembly (271) of the B-axis (200). For example, the cooling rings are arranged and designed as described in connection with the A-axis (100). The cooling rings and the cooling plates (274) of the B-axis (200) are hydraulically connected in series with one another, for example. Therefore, the cooling assembly (271) has a coolant inlet and a coolant outlet. For example, the coolant inlet of the cooling assembly (271) of the B-axis (200) is hydraulically arranged downstream of the coolant outlet of the cooling assembly (171) of the A-axis (100).

The support plate assembly (223) of the individual axis drive assembly (210; 215) of the B-axis (200) has a transmission support plate (224) and a motor support plate (226). The transmission support plate (224) is rigidly connected to the fastening flange (211) by means of the housing (264) of the gear transmission stage (262). Two cylindrical shaft bushings (227) are arranged in the transmission support plate (224). The diameter of the shaft bushings (227), for example, is larger than the diameter of the skirts (235) of the toothed belt pulleys (234, 236, 237). The motor support plate (226) is adjustably mounted on the transmission support plate (224). For this purpose, the motor support plate (226) has slotted holes (225) in which fastening screws can be inserted to fasten the motor support plate (226) to the transmission support plate (224). This setting can be used, for example, to adjust the tension of the serpentine drive (233).

The two drive motors (221) of the two axis drive assemblies (210, 215) are synchronized with one another during operation. For example, the respective angle measuring systems and control systems are coupled with one another by means of the electronics component assembly (251). During operation of the B-axis (200), the sum of the powers of the two drive motors (221) is transmitted to the output element (291). An absolute angle measuring system (293), for example, monitors the pivot angle of the output element (291). The value of such sensor is also fed back to the electronics component assembly (251).

Figure 6:
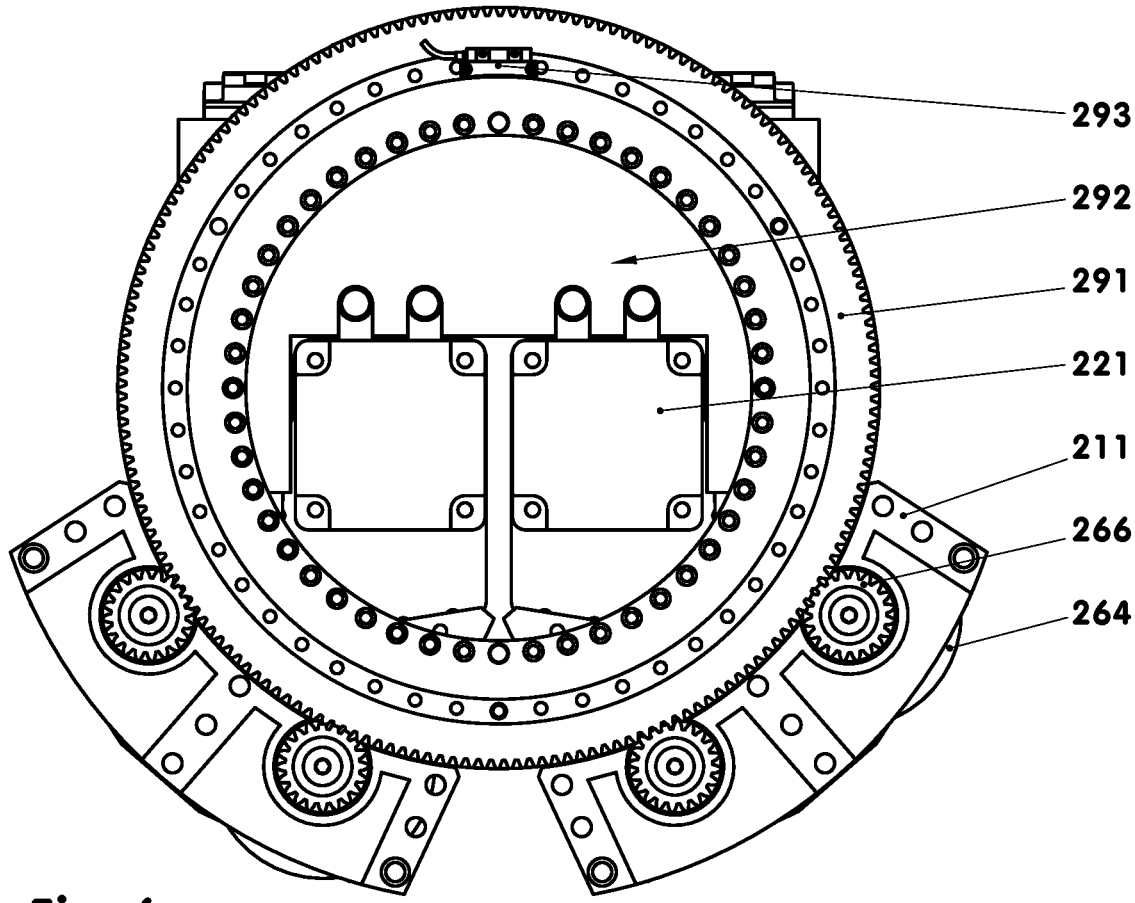
FIG. 6: Axis drive assembly of the B-axis with an output element.
Figure 7:
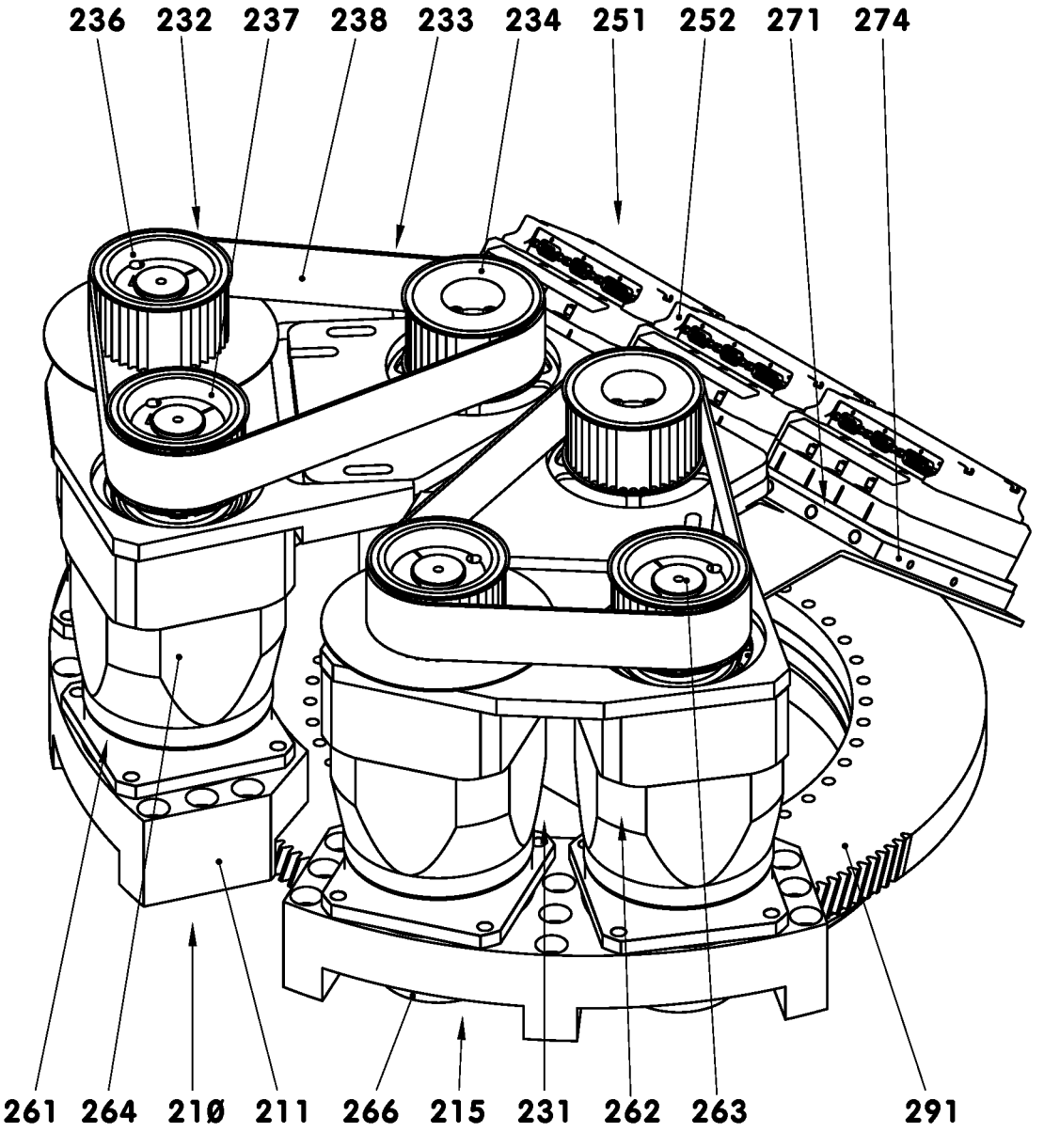
FIG. 7: B-axis drive.

In the representation in FIG. 6, the drive motors (221) protrude into the region encompassed by the output element (291). The remaining free space (292) is greater than 40% of the circular area bounded by the inside diameter of the output element (291). Supply, data and signal lines to the other component assemblies of the industrial robot (10) can be routed in this free space (292).

The foot lever (31) connects the B-axis (200) with a C-axis (300). The C-axis (300) is the third main axis (300) of the industrial robot (10). The media, power and data lines are further routed through the foot lever (31). The length of the foot lever (31) is 1200 millimeters, for example. In the exemplary embodiment, a toggle lever (41) is pivotably mounted relative to the foot lever (31) by means of the C-axis (300).

Figure 8:
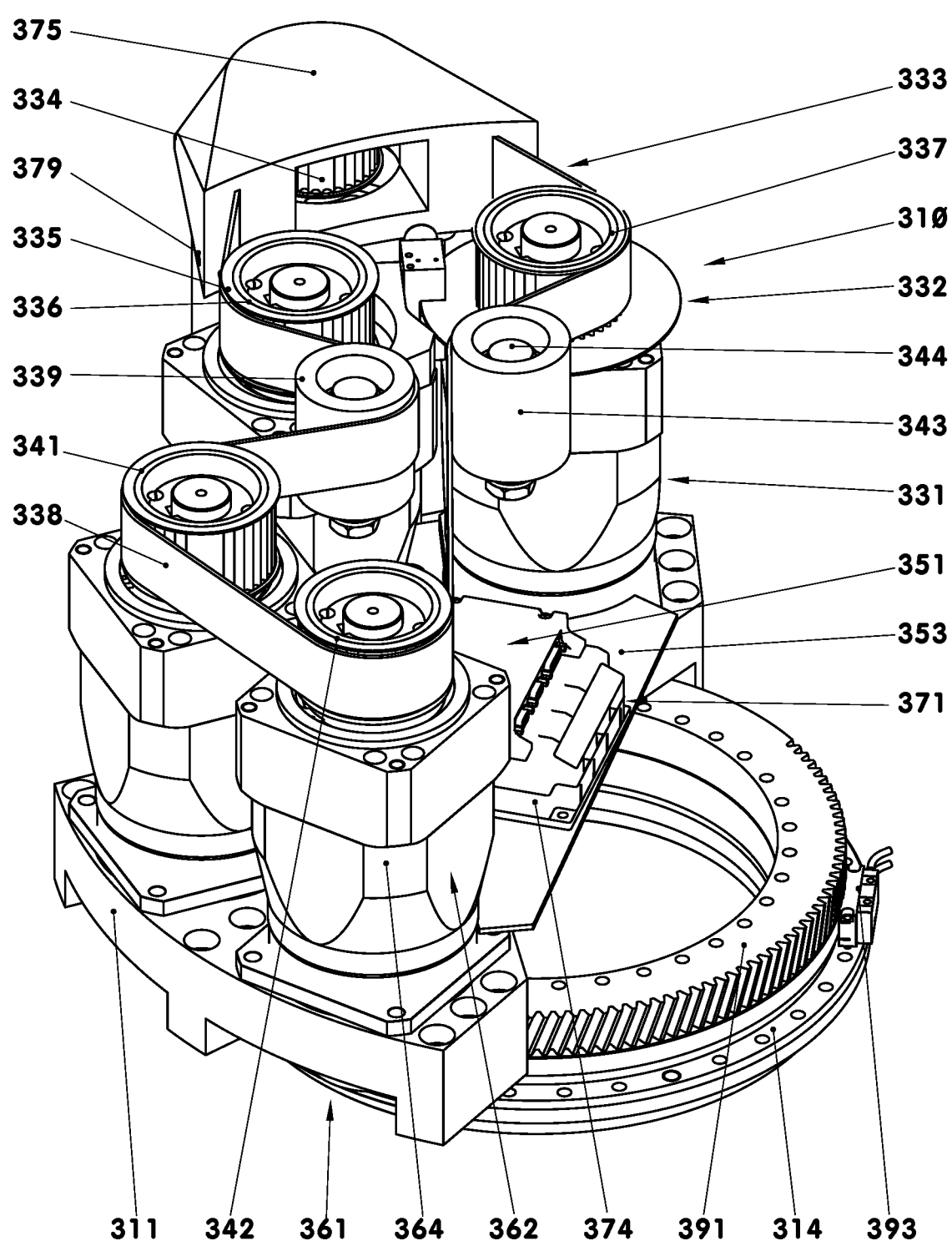
FIG. 8: C-axis drive.
Figure 9:
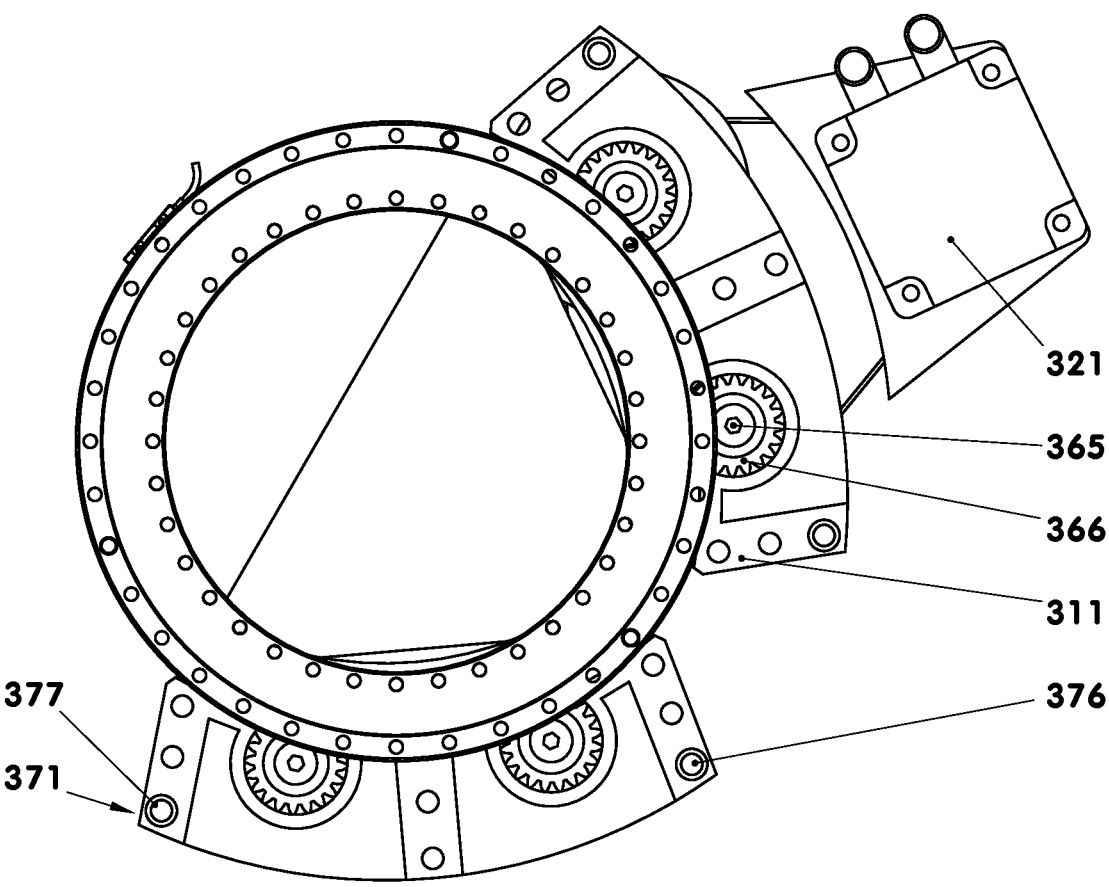
FIG. 9: Drive of the C-axis from the pinion side.

The C-axis (300) is driven, for example, by means of the axis drive assembly (310) shown in FIGS. 8 and 9, which interacts with the output element (391) of the C-axis (300). The output element (391) is a spur gear with an outer toothing in this exemplary embodiment as well. For example, its inside diameter is 27% of the length of the foot lever. The illustrated output element (391) of the C-axis (300), for example, has 129 teeth and a module of 3 millimeters. It is designed with helical teeth. In the exemplary embodiment shown, the output element (391) is fastened to the foot lever (31). The axis drive assembly (310) is arranged in the toggle lever (41). It is also conceivable to arrange the axis drive assembly (310) in the foot lever (31) and the output element (391) on the toggle lever (41).

The axis drive assembly (310) of the C-axis (300) has a drive motor (321), to which a branching stage (332) of the transmission (331) is downstream. For example, the drive motor (321) is constructed in the same manner as the drive motors (121; 221) of the A-axis (100) and the B-axis (200). The performance data of the aforementioned drive motors (121; 221; 321) also correspond to one another, for example. In this exemplary embodiment, the drive motor (321) is arranged outside the envelope contour of the output element (391). For example, a cooling plate (374) is arranged centrally on a support plate (353) and carries an electronics component assembly (351). The support plate (353) is fastened to the fastening flanges (311) of the axis drive assembly (310). The functions of the electronics component assembly (351) of the C-axis (300), for example, correspond to the functions of the electronics component assembly (251) of the B-axis (200).

The drive motor (321) is located in some regions under a cooling hood (375), which is part of a cooling assembly (371) of the C-axis (300). For example, the cooling hood (375) has an outward-facing water inlet connection (379) and a water outlet connection. Cooling channels are arranged inside the cooling hood (375). These are designed to be meander-shaped, for example, such that the inner surface of the cooling hood (375) is cooled largely evenly. The support component assembly of the axis drive assembly (310) of the C-axis (300) is not shown here.

The branching stage (332) of the axis drive assembly (310) of the C-axis (300) is designed as a serpentine drive (333) in the structural form of a toothed belt drive. The serpentine drive (333) shown is a heptagon drive (333) with five toothed belt pulleys (334, 336, 337, 341, 342) and two tensioning rollers (339, 343). For example, all toothed belt pulleys (334, 336, 337, 341, 342) have a width of 50 millimeters and lateral skirts (335). The toothed belt (338) wraps around them. The tensioning rollers (339, 343) are in contact with the outer side of the toothed belt (338). They are designed to be cylindrical and are in each case rotatably mounted on a mandrel (344). Their width is greater than the width of the toothed belt (338).

A first toothed belt pulley (334) is fastened to the motor shaft of the drive motor (321). This has 32 teeth, for example. The driven toothed belt pulleys (336) in each case have 40 teeth. The branching stage (332) of the transmission (331) of the C-axis (300) has four gear trains (361). These are arranged parallel to one another. Each gear train (361) has a transmission housing (364) in which a gear transmission stage (362) is arranged. The transmission housings (364) in each case of two gear trains (361) are seated in a fastening flange (311). The two fastening flanges (311) are designed to be identical to one another, for example. The mounting of the respective transmission housing (364) in the fastening flange (311) has, for example, a water-cooled cooling ring of the cooling assembly (371). Such cooling rings are, for example, designed and arranged in the same manner as the cooling rings (172) of the A-axis. FIG. 9 shows a water inlet connection (376) and a water return connection (377) on the fastening flange (311). For example, both fastening flanges (311), the cooling plate (374) and the cooling hood (375) are cooled in series.

In this exemplary embodiment, the gear transmission stage (362) also has one planetary gear per gear train (361). The individual planetary gear has in each case a transmission ratio of 1:32, for example. The pinions (366) of all gear trains (361) in each case have 20 teeth. They have the same module and the same helix angle as the output element (391) of the C-axis (300). In this exemplary embodiment, each pinion (366) also forms a helical-toothed spur gear pair with the output element (391) with axes parallel to one another. The toothing can be designed as described in connection with the B-axis (200). In each case, two pinions (366) can be braced against one another. Thus, the branching stage (332) of the C-axis (300) has a power branching in each case that transmits the power of the drive motor (321) to at least two pinions (366) meshing with the output element (391).

The output element (391) is rotatably or pivotably mounted on a bearing flange (314) of the axis drive assembly (310). For example, roller bearings, which absorb both axially oriented and radially oriented forces and moments, are used for support. A two-part angle measuring system (393), for example, is arranged on the axis drive assembly (310) and on the output element (391). This is designed, for example, like the angle measuring system (293) described in connection with the B-axis (200). The absolute value of the pivot angle of the output element (391) relative to the axis drive assembly (310) ascertained by means of the angle measuring system (393) is fed to the regulation system of the drive motor (321). A new target value for the drive motor (321) is then ascertained from the measured value in the electronics component assembly (351).

During operation of the industrial robot (10), the drive motor (321) is electrically controlled upon a movement of the C-axis (300). The motor power is transmitted to the toothed belt (338) via the drive-side toothed belt pulley (334). The cooling hood (375) cools the highly stressed components, such that they do not overheat. At the same time, the cooling plate (374) of the electronics module (351) prevents damage to the electronic components due to overheating. In the C-axis (300) as well, for example, all components of the cooling assembly (371) are hydraulically connected in series. Both the design of the transmission (331) and the design of the cooling assembly (371) contribute to a high power density of the axis drive assembly (310).

By means of the branching stage (332), the movement of the toothed belt (338) is distributed to all gear trains (361). With a power branching, two or more gear trains (361) in each case transmit a portion of the drive power of the drive motor (321) to their respective pinion (366). The individual pinions (366) can also be braced relative to one another in this exemplary embodiment. The cooling arranged in the fastening flange (311) limits the temperature rise of the bearing of the output shaft (365) of the gear transmission. The large profile overlap and, if necessary, the design of the toothing profile prevent damage to the output-side toothing even during highly dynamic operation of the industrial robot (10).

Figure 10:
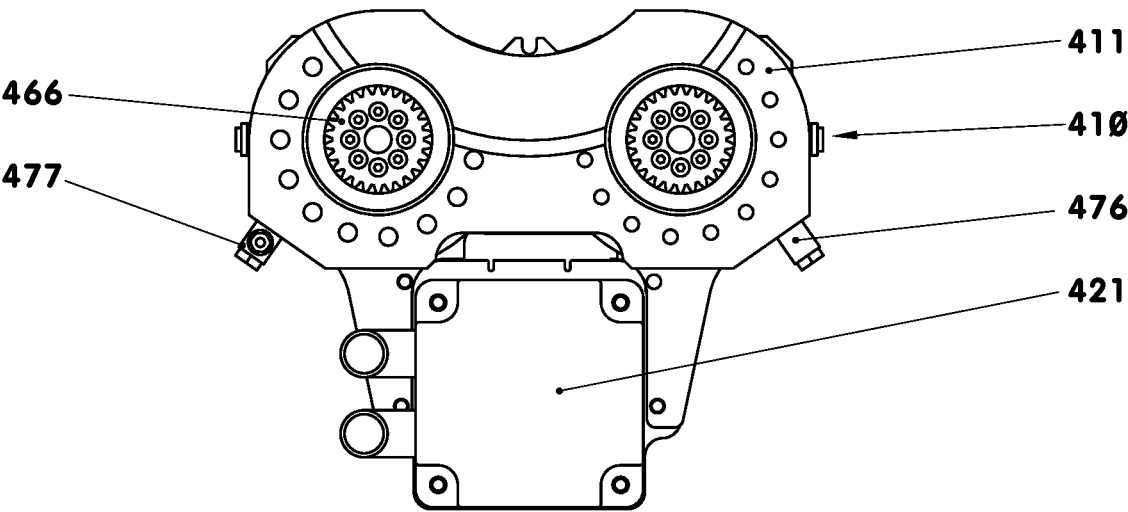
FIG. 10: Drive of the D-axis.
Figure 11:
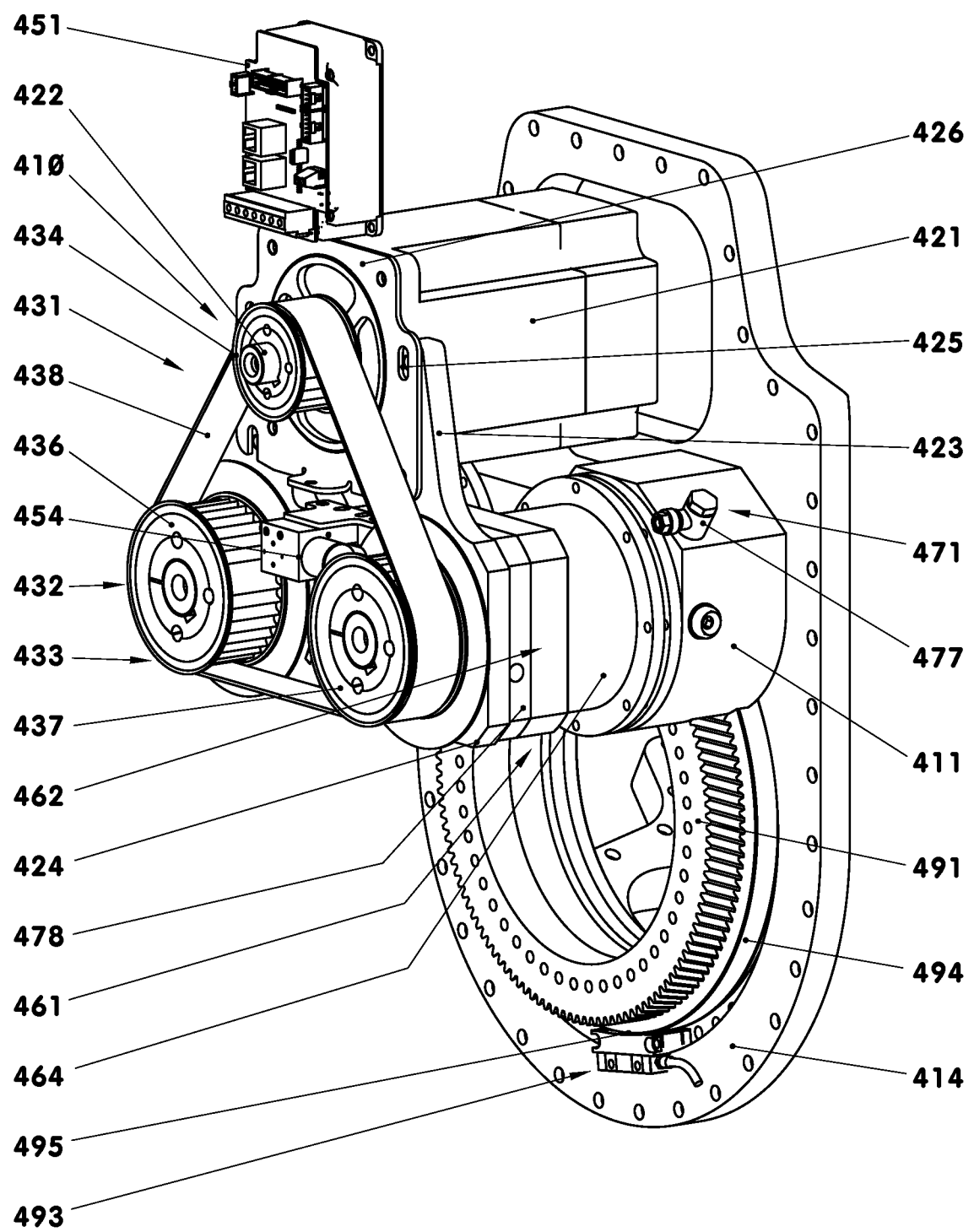
FIG. 11: Axis drive assembly of the D-axis with output element.

A pivot head (51) is pivotably mounted on the toggle lever (41). The pivot axis (400) formed by the toggle lever (41) and the pivot head (51) is a first secondary axis. It is referred to below as the D-axis (400). FIGS. 10 and 11 show the axis drive assembly (410) of the D-axis (400) and the output element (491). The output element (491) of the D-axis (400) is a ring-shaped spur gear with an outer toothing. It carries an involute toothing designed as helical toothing. For example, this has 120 teeth and a module of 2 millimeters. In this exemplary embodiment, the output element (491) is seated on a contact ring (494). Both parts are fastened together in the pivot head (51). A measuring sensor (495) is arranged on a bearing flange (414) of the axis drive assembly (410), which together with the contact ring (494) forms an angle measuring system (493). The pivot angle of the pivot head (51) relative to the toggle lever (41) can be ascertained by means of such angle measuring system (493). The angle measuring system (493) can be designed to be optical, magnetic, capacitive, etc. The angle measuring system (493) is electrically connected to the electronics component assembly (451) of the D-axis (400).

The axis drive assembly (410) of the D-axis (400) has a drive motor (421) and a transmission (431) arranged downstream of the drive motor (421) with a branching stage (432) and with two gear trains (461) of a gear transmission stage (462). The rated power and the maximum power of the drive motor (421) are, for example, one third of the corresponding powers of the drive motors (121, 221, 321) of the main axes (100, 200, 300). The drive motor (421) is fastened to a motor support plate (426), which is part of a support plate assembly (423). The motor support plate (426) has slotted holes (425) in order to adjust it with respect to a transmission support plate (424).

The branching stage (432) of the D-axis (400) is designed as a serpentine drive (433) without additional tensioning elements. The serpentine drive (433) designed as a triangle drive in this exemplary embodiment is a toothed belt drive. The structure of the toothed belt (438) of the toothed belt drive and the shape of the teeth correspond, for example, to the design of the toothed belts (138, 238, 338) of the axis drive assemblies (110, 210, 310) of the main axes (100, 200, 300). The pitch also corresponds to the versions of the main axes (100, 200, 300). The width of the toothed belt (438) of the D-axis (400) is, for example, 60% of the width of the toothed belts (138, 238, 338) of the main axes (100, 200, 300).

The driving toothed belt pulley (434) seated on the motor shaft (422) of the drive motor (421) has 24 teeth, for example. The driven toothed belt pulleys (436, 437) in each case have 36 teeth, such that, for example, the sum of the torques of the driven toothed belt pulleys (436, 437) is greater than the torque of the driving toothed belt pulley (434).

A sensor unit (454) is arranged on the transmission support plate (424) of the D-axis (400). The sensor unit (454) comprises, for example, an optical, capacitive or electromagnetic sensor. This can be used, for example, to monitor the rotational speed of the driven toothed belt pulley (436; 437).

In this exemplary embodiment, the two gear trains (461) also in each case have a planetary gear arranged in a housing (464). On the input side, the bearings of the two planetary gears are seated in a cooling support plate (478) of a cooling assembly (471). This is, for example, a plane-parallel plate with liquid channels introduced into it.

The individual planetary gear, for example, has a transmission ratio of 1:20. The two housings (464) are seated on the output side in a cooling ring of the fastening flange (411). The cooling ring of the cooling assembly (471) is designed and arranged as described in connection with the aforementioned axes (100, 200, 300). The cooling ring is located, for example, between a water inlet connection (476) and a water return connection (477) of the fastening flange (411). This is used to cool the bearing of the pinion (466). By means of the fastening flange (411), the axis drive assembly (410) of the D-axis (400) is fastened in the toggle lever (41) in the exemplary embodiment.

The two pinions (466) of the D-axis (400) are helical-toothed spur gears. In the exemplary embodiment, its external toothing has 26 teeth and the module of the output element (491). The profiles of the pinions (466) and/or the output element (491) of the D-axis (400) can be modified, as explained in connection with the other axes (100, 200, 300). The two pinions (466) can also be braced against one another.

The axis drive assembly (410) of the D-axis (400) can also be arranged in the pivot head (51). In this case, the output element (491) is fastened to the toggle lever (41).

The pivot head (51) of the industrial robot (10) carries two output flanges (61, 62) that can be rotated relative to the pivot head (51). Such output flanges (61, 62) are arranged opposite one another. An output element (591, 596) is fastened to each of the output flanges (61; 62). Together with at least one of the output elements (591; 596), the pivot head (51) forms a second secondary axis (500). This is referred to below as the E-axis (500).

Figures 12, 13:
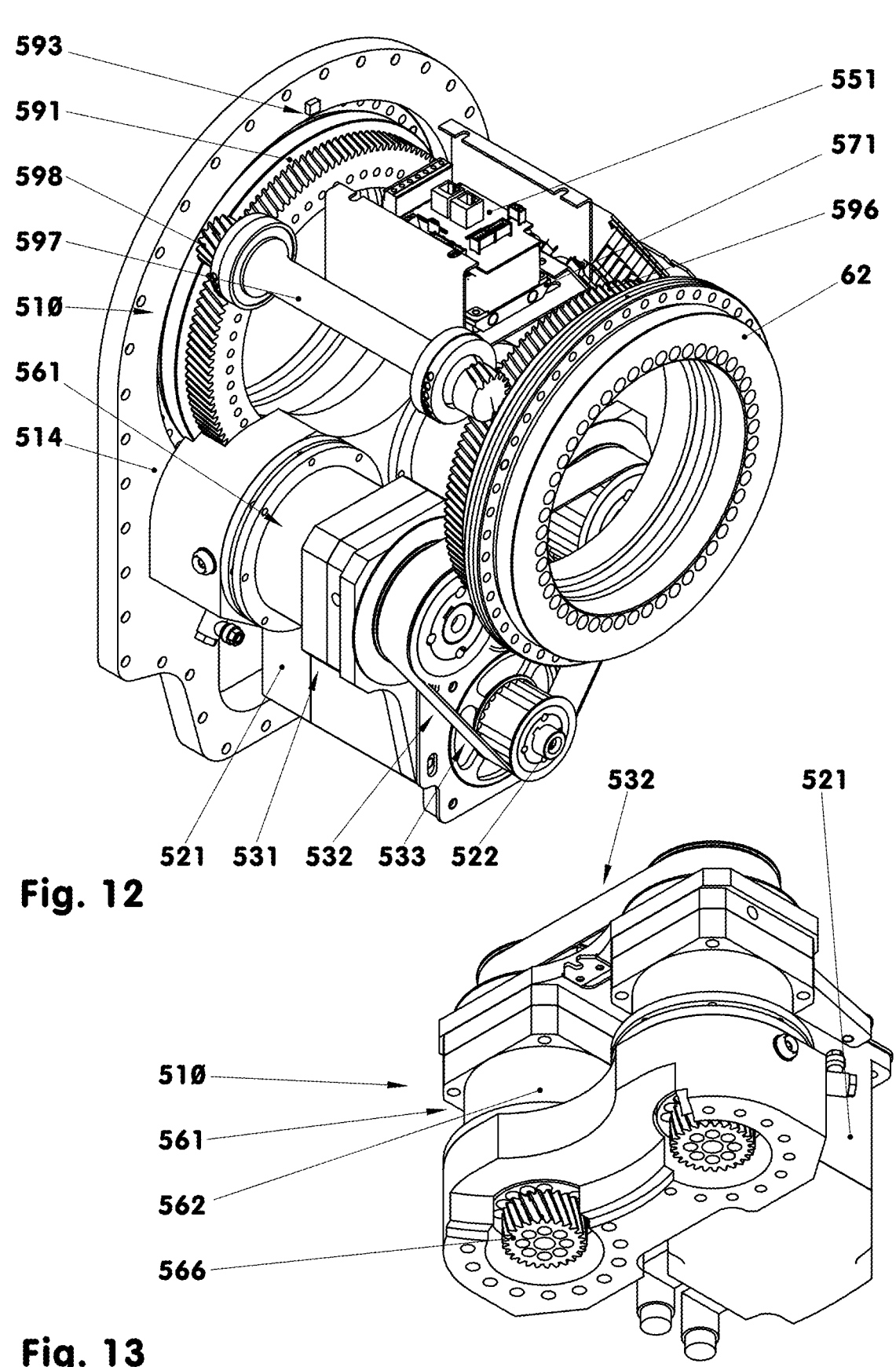
FIG. 12: Drive of the E-axis.
FIG. 13: Axis drive assembly of the E-axis.

The axis drive assembly (510) of the E-axis (500), see FIGS. 12 and 13, is designed identically to the axis drive assembly (410) of the D-axis (400) in the exemplary embodiment. It has a drive motor (521), a two-stage transmission (531), for example, an electronics component assembly (551) and a cooling assembly (571). The branching stage (532) of the transmission (531) is designed as a serpentine drive (533) in the structural form of a triangle drive (533). The two pinions (566) of the E-axis (500) mesh with a first output element (591). Such first output element (591) is designed in the same manner as the output element (491) of the D-axis (400). The rotational speed and position of the first output flange (61) relative to the head housing (52) of the pivot head (51) can be monitored by means of an angle measuring system (593). For this purpose, for example, an absolute angle measuring system (593) is arranged on a bearing flange (514) of the axis drive assembly (510) and on the output element (591). The angle measuring system is designed, for example, as described in connection with the other axes (100; 200; 300; 400) of the industrial robot (10). It is also conceivable to drive the second output element (596) directly by means of the axis drive assembly (510), such that the pinions (566) mesh with such second output element (596).

The first output element (591) is coupled to the second output element (596) by means of a synchronous shaft (597) rotatably mounted in the pivot head (51). The second output element (596) is designed identically to the first output element (591), for example. It is fastened, for example directly, to the second output flange (62).

The synchronous shaft (597) is a shaft made of a steel material. The axis of rotation of the synchronous shaft (597) is parallel to the axes of the pinions (566) and the output elements (591, 596). The synchronous shaft (597) has drive pinions (598) at both ends, each of which meshes with one of the output elements (591; 596).

During operation of the E-axis (500), the rotation of the motor shaft (522) of the drive motor (521) is transmitted to the pinions (566) by means of the branching stage (532) and the, for example downstream, gear transmission stage (562) with two gear trains (561). The two pinions (566) mesh, for example, with the first output element (591) of the E-axis (500), such that the first output flange (61) is rotated or pivoted. At the same time, the second output element (596) is driven by the synchronous shaft (597). Thus, the second output element (596) is arranged downstream of the first output element (591) in this exemplary embodiment. By means of the second output element (596), the second output flange (62) is pivoted, for example, at the same angular speed and in the same direction of rotation as the first output flange (61). If necessary, one of the output flanges (61, 62) can also run idle.

It is also conceivable to design or actuate the synchronous shaft (597) with a switchable clutch. For example, the synchronous shaft (597) as a whole can be brought into engagement with both output elements (591, 596) by means of a disconnecting clutch. When using an axial clutch in the synchronous shaft (597), such axial clutch is closed to transmit a torque. If the second output element (596) is not required, the clutch can be opened. For example, the second output element (596) has an angle measuring system.

It is also conceivable to control the two output flanges (61, 61) both together and individually. For this purpose, for example, an output element meshing with the axis drive assembly (510) can be coupled with two shafts pointing in different directions, for example. The individual shaft is designed, for example, like the synchronous shaft (597) shown in FIG. 12. It is designed as a disconnecting shaft, for example. If only one shaft is engaged, either the gear wheel fastened to the first output flange (61) or the gear wheel fastened to the second output flange (62) also rotates. When engaging both shafts, both output flanges (61, 62) are also rotated.

Combinations of the individual exemplary embodiments are also conceivable. It is also conceivable to arrange the individual drives on axes other than those mentioned. The industrial robot (10) can have several axes (100, 200, 300, 400, 500) with similarly designed drives. The industrial robot (10) can also have only a single axis (100, 200, 300, 400, 500), the drive of which is designed as described.

LIST OF REFERENCE SIGNS

10 Industrial robot
11 Bed
12 Guide rails
21 Base frame
22 Recirculating ball shoes
23 Base plate
24 Mounting flange
25 Support flange
31 Foot lever
41 Toggle lever
51 Pivot head
52 Head housing
61 Output flange, first output flange
62 Output flange, second output flange
100 A-axis, main axis, translational axis
110 Axis drive assembly
111 Fastening flange
112 Transmission mounts
113 Recess
121 Drive motor
122 Motor shaft
123 Support plate assembly
124 Support plate
125 Slotted holes
127 Covering hood
131 Transmission
132 Branching stage
133 Serpentine drive, triangle drive
134 Toothed belt pulley, drive pulley
135 Skirts
136 Toothed belt pulley, driven pulley
137 Toothed belt pulley, driven pulley
138 Toothed belt
161 Gear trains
162 Gear transmission stage
163 Transmission shaft
164 Housing
165 Output shaft
166 Pinion, spur gear
171 Cooling assembly
172 Cooling rings
173 Cooling channel
191 Output element, toothed rod
200 B-axis, main axis, pivot axis
210 Axis drive assembly
211 Fastening flange
215 Axis drive assembly
221 Drive motors
222 Motor shafts
223 Support plate assembly
224 Transmission support plate
225 Slotted holes
226 Motor support plate
227 Shaft bushings
231 Transmission stage
232 Branching stage
233 Serpentine drive
234 Toothed belt pulley
235 Skirts
236 Toothed belt pulley
237 Toothed belt pulley
238 Toothed belt
251 Electronics component assembly
252 Electronics module
261 Gear trains
262 Gear transmission stage
263 Transmission shaft
264 Housing
266 Pinion
271 Cooling assembly
274 Cooling plate
291 Output element, spur gear 292 Free space
293 Angle measuring system
300 C-axis, main axis
310 Axis drive assembly
311 Fastening flange
314 Bearing flange
321 Drive motor
331 Transmission
332 Branching stage
333 Serpentine drive, heptagon drive
334 Toothed belt pulley
335 Skirts
336 Toothed belt pulley
337 Toothed belt pulley
338 Toothed belt
339 Tensioning roller
341 Toothed belt pulley
342 Toothed belt pulley
343 Tensioning rollers
344 Mandrel
351 Electronics component assembly
353 Support plate
361 Gear trains
362 Gear transmission stage
364 Housing, transmission housing
365 Output shaft
366 Pinion
371 Cooling assembly
374 Cooling plate
375 Cooling hood
376 Water inlet connection
377 Water outlet connection
379 Water inlet connection
391 Output element, spur gear
393 Angle measuring system
400 D-axis, secondary axis, pivot axis
410 Axis drive assembly
411 Fastening flange
414 Bearing flange
421 Drive motor
422 Motor shaft
423 Support plate assembly
424 Transmission support plate
425 Slotted holes
426 Motor support plate
431 Transmission
432 Branching stage
433 Serpentine drive, triangle drive
434 Toothed belt pulley, driving
436 Toothed belt pulley, driven
437 Toothed belt pulley, driven
438 Toothed belt
451 Electronics component assembly
454 Sensor unit
461 Gear trains
462 Gear transmission stage
464 Housing
466 Pinion
471 Cooling assembly
476 Water inlet connection
477 Water return connection
478 Cooling support plate
491 Output element, spur gear
493 Angle measuring system
494 Contact ring
495 Measuring sensor
500 E-axis, secondary axis 510 Axis drive assembly
514 Bearing flange
521 Drive motor
522 Motor shaft
531 Transmission
532 Branching stage
533 Serpentine drive, triangle drive
551 Electronics component assembly
561 Gear trains
562 Gear transmission stage
566 Pinion
571 Cooling assembly
591 Output element, first output element, spur gear
596 Output element, second output element, spur gear
597 Synchronous shaft
598 Drive pinion

The invention claimed is:

1. An industrial robot, comprising:
a translational or rotational axis including an output
    element that has a toothing; and
an axis drive assembly that is associated with the trans-
    lational or rotational axis and meshes with the output
    element,
    wherein the axis drive assembly includes a drive motor
        and
        a transmission connected downstream of the drive
            motor,
    wherein
        the output element is a toothed rod if the translational
            or rotational axis is a translational axis and
        the output element is a spur gear with an outer toothing
            if the translational or rotational axis is a rotational
            axis, and
    wherein the transmission has a branching stage that
        distributes a rotational movement of a motor shaft of
        the drive motor to at least two gear trains, such that at
        least two pinions driven by the drive motor mesh with
        the output element, and
    wherein an electronics component assembly including a
        control system of the drive motor is arranged on the
        axis drive assembly.

2. The industrial robot according to claim 1,
wherein the branching stage has a toothed belt drive
    designed as a serpentine drive.

3. The industrial robot according to claim 1,
wherein the drive motor and the pinions have non-aligned
    axes of rotation parallel to one another.

4. The industrial robot according to claim 1,
wherein a displacement measuring system or an angle
    measuring system is arranged on the output element
    and on the axis drive assembly.

5. The industrial robot according to claim 1,
wherein the translational axis or the rotational axis is
    assigned at least two axis drive assemblies that mesh
    with the output element.

6. The industrial robot according to claim 1, further
comprising
    at least two further axes, each having a further output
        element;
    a respective further axis drive assembly assigned to each
        of the at least two further axes,
        each further axis drive assembly having a further
            transmission with a further branching stage and at
            least two further gear trains,
            wherein each further gear train has a further pinion
                that meshes with the respective further output
                element.

7. The industrial robot according to claim 1,
wherein the axis drive assembly is assigned a cooling
assembly through which fluid flows.

8. The industrial robot according to claim 7,
wherein the electronics component assembly and bearings
of the pinions are fluid-cooled.

9. The industrial robot according to claim 7,
wherein all cooling assemblies of the industrial robot are
hydraulically connected in series.

* * * * *